US009470248B2

(12) United States Patent
Paulmann

(10) Patent No.: US 9,470,248 B2
(45) Date of Patent: Oct. 18, 2016

(54) FLEXIBLE RESPONSE SECURED MECHANICAL BALANCING FOR MULTIPLE CONTROL ACTUATORS WITH A COMMON OUTPUT

(71) Applicant: AIRBUS HELICOPTERS DEUTSCHLAND GMBH, Donauworth (DE)

(72) Inventor: Gregor Paulmann, Neukeferloh (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 295 days.

(21) Appl. No.: 14/463,832

(22) Filed: Aug. 20, 2014

(65) Prior Publication Data

US 2015/0075149 A1 Mar. 19, 2015

(30) Foreign Application Priority Data

Sep. 17, 2013 (EP) .................................... 13400019

(51) Int. Cl.
*F15B 15/02* (2006.01)
*B64C 13/42* (2006.01)
*F15B 18/00* (2006.01)

(52) U.S. Cl.
CPC ............... *F15B 15/02* (2013.01); *B64C 13/42* (2013.01); *F15B 18/00* (2013.01); *F15B 2211/8757* (2013.01)

(58) Field of Classification Search
CPC ...... B63C 13/42; B63C 13/503; F15B 18/00
USPC .......................................... 91/509, 510, 512
See application file for complete search history.

(56) References Cited

U.S. PATENT DOCUMENTS 3,469,501 A 9/1969 Middleton
3,527,143 A * 9/1970 Hayter .................... B64C 13/42 244/99.4
3,837,262 A * 9/1974 Hedermann ............ B64C 13/00 91/365
3,933,176 A * 1/1976 Wheeler ................. F15B 18/00 137/596
4,472,998 A * 9/1984 Vanderlaan ............. F15B 18/00 137/596.15

(Continued)

FOREIGN PATENT DOCUMENTS

EP 0112624 7/1984
WO 03098052 11/2003

OTHER PUBLICATIONS

Extended European Search Report for EP 13400019.9, Completed by the European Patent Office, Dated Feb. 19, 2014, 4 pages.

(Continued)

*Primary Examiner* — Thomas E Lazo
(74) *Attorney, Agent, or Firm* — Brooks Kushman P.C.

(57) ABSTRACT

A flexible response secured mechanical balancing device (D) for multiple hydraulic control actuators (1-2) with a common output member (5*a*-*b*). The balancing device (D) provides flexible/continuous fluid-pressure force fight compensation. Balance valves (17-20) are commanded to balance fluid-pressure from a first fluid-pressure network (52*a*) of a second actuator (2). Each fluid-pressure commanded balance valve (17-20) is arranged to allow relief of differential pressure, directly into a dedicated first (52*a*) or second fluid-pressure network (52*b*). A fluid-pressure controlled locking device (21-22) is allowing inhibiting the corresponding pairs of balance valves (17-20) e.g. in case of loss of fluid-pressure. The invention typically applies to vehicles (A) including: aircrafts, rotorcrafts, drones.

15 Claims, 2 Drawing Sheets

(56) References Cited

U.S. PATENT DOCUMENTS

| | | | | |
|---|---|---|---|---|
| 4,549,977 | A | 10/1985 | Joshi et al. | |
| 6,981,439 | B2 * | 1/2006 | Hart | B64C 13/42 60/403 |
| 8,020,379 | B2 * | 9/2011 | Kakino | F15B 18/00 244/78.1 |
| 8,181,901 | B2 | 5/2012 | Roesch | |
| 2005/0132877 | A1 | 6/2005 | Hart | |
| 2011/0108671 | A1 | 5/2011 | Soronda | |
| 2011/0109671 | A1 | 5/2011 | Tai et al. | |
| 2011/0251739 | A1 | 10/2011 | Tomas et al. | |
| 2012/0241563 | A1 | 9/2012 | Chaduc et al. | |

OTHER PUBLICATIONS

Website http://www.liebherr.com/AE/en-GB/126883.wfw?file=~%2FCMS%2Fdownloads%2FBP_Helicopter_20s_enGB_04.pdf) Printed in Germany by Typodruck BK AER-10.030-0.5-10.10e, Jul. 20, 2011, 20 Pages, “Liebherr-Systems for Helicopters High-Tech on Board.”

* cited by examiner

FLEXIBLE RESPONSE SECURED MECHANICAL BALANCING FOR MULTIPLE CONTROL ACTUATORS WITH A COMMON OUTPUT

CROSS REFERENCE TO RELATED APPLICATION

This application claims priority to European patent application No. 13 400019.9 filed on Sep. 17, 2013, the disclosure of which is incorporated in its entirety by reference herein.

BACKGROUND OF THE INVENTION (1) Field of the Invention

The invention concerns a flexible response secured mechanical balancing device for a multiple fluid-pressure control actuators system in a vehicle.

(2) Description of Related Art

The most general technical domain of the invention is the one of fluid-pressure actuators, e.g. of the hydraulic type, for displacing one or a plurality of output members between two extreme positions. Depending on applications, this displacement is either linear or rotational.

The invention concerns multiple fluid-pressure actuators, i.e. wherein a plurality of fluid-pressure actuators cooperate together so as to produce a power force capable of displacing a set of output members, either with a linear motion or rotational motion.

As exposed further on, the invention specifically relates to such multiple fluid-pressure actuators which are distinct one with the other, placed in series one relative the other and having a plurality of mechanically linked output members, i.e. common output members that are movable together as a single unitary set.

The common output members of a single actuating system behave as a unique output organ, so that any identical control movements at one common output member provokes the same control movement at each other common output member in the same actuating system.

In examples of the invention, these common output members are dedicated to control systems in vehicles like aircrafts. For instance, these control systems are flight controls for displacing between two extreme positions one or a plurality of aerodynamic arrangements of e.g. flying-control surfaces, lift-increasing flaps, air brakes, spoilers, flaps or the like, through operation of the fluid-pressure actuators.

The invention is also useful in the field of rotary wing aircrafts, where the safety and weight requirements are especially drastic.

The invention responds to several technical problems.

In vehicles like aircrafts having control systems with multiple fluid-pressure actuators, a technical problem is mentioned as “Avoiding Force Fight”. When a multiple fluid-pressure actuator is providing power to offer motion to a given aircraft control system, it is needed to ensure a convenient mitigation of force fight between each of the cooperating fluid-pressure actuators which are coupled to a set of common mechanical output members and which are powered by at least two independent fluid-pressure networks.

In an aircraft control system of the type aimed by the invention, the plural independent fluid-pressure networks (each having e.g. tanks, circuitry, pumps and valves, etc.) are arranged to be able to produce continuously, simultaneously and cooperatively the fluid-pressure power generating the aimed location/positioning movement of the common output members of the actuators: this is called an “active-active” operation mode.

In theory, the active-active operational mode does present the potential for a resultant force fight between the active actuators controlling the common output members. The force-fight results from the fact that the actuator components—in all the involved independent fluid-pressure networks—have distinct and unique tolerances. The term tolerance means here positional, shape and dimensional actual characteristics.

The installation and component position adjustment optimizing reduces some of the differences between coupled independent fluid-pressure networks. Although, the still existing differences as well as further shifts during operation, e.g. due to wear, can result in one independent fluid-pressure network to attempt to position one of the common output members towards a different location than the position attempted by another independent fluid-pressure network.

The resulting effect is differential fluid-pressure development in the extension/retraction chambers of the cooperating actuators, causing in antagonistic force or torsion moment (torque) development on the common output members. This is because the fluid pressure in the actuators competes with each other to displace the common output members to different positions/locations, while they are linked together mechanically.

This differential and antagonistic force or torsion moment introduces stress to the common parts of the actuators and do result in a fatigue load accumulation.

This problem could be summed up in balancing the relative pressure in the separate fluid-pressure independent network, so as to avoid deleterious stress and constraints within a control actuator for an aircraft.

So as to obtain such balancing, it has been proposed to make use of electronic devices. Any solution to reduce force fight by the usage of electronic balancing devices does need a complex electric and electronic environment to interface with the balancing means controlling the relative fluid-pressure. For instance, such an electronic environment is of a fly-by-wire architecture.

In some types of aircrafts, such electronic balancing devices cannot be used due to the electronic environment (e.g. existing/basic architecture) for the aircraft that cannot provide a convenient interface. A convenient electronic architecture, i.e. compatible with nowadays electronic balancing devices, may neither exist onboard and/or be compatible with a given aircraft.

The alternative to electronic balancing devices is usually called a mechanical balancing device. Such mechanical balancing devices generally provide spring loaded relief valve function, integrated into by-pass valves. This is realized in actual design e.g. in the 4-axis actuator of the TIGER® helicopter (Cf. e.g.: http://www.liebherr.com/AE/en-GB/126883.wfw?file=~%2FCMS%2Fdownloads%2FBP_Helicopter_20s_enGB_04.pdf).

Another problem is related to existing mechanical balancing devices. In some available mechanical balancing devices, having a spring loaded relief valve function integrated into by-pass valves, the mechanical balancing device can only provide a monolithic relief against a single predetermined level of pressure, defined by the mechanic characteristics of the relevant spring.

This technical problem is the limitation to monolithic relief against a single level of pressure, while flexible/ adaptive relief against a plurality of occurring levels of pressure would be useful for enhancing the precision, safety maneuverability of the aircraft equipped with (a) mechanical balancing device(s).

Therefore, a flexible (i.e. adaptive or variable) balancing of different pressure levels, creating forces below/above a pre-determined/single spring force, is not available with present mechanical balancing devices.

A further problem relates to some operation modes. In an aircraft control system of the type concerned by the invention, the multiple independent fluid-pressure networks are arranged to produce continuously, simultaneously and cooperatively the control power generating the aimed position/movement in the common output member: this is the "active-active" operation mode. Other "active-passive" operation modes have to be provided, that should meet the pre-requisites for safe operation required by airworthiness regulations.

In some aircraft control systems having a mechanical balancing device, should an "active-passive" operation mode be implemented, this would render the active pressure impossible to be used by the actuator. Such prior art mechanical balancing devices does allow a multi located pressure balancing in the continuous "active-active" operation mode of the fluid-pressure networks. But the prior art mechanical balancing devices do not allow the "active-passive" operation modes.

In case of "active-passive" operation mode, the mechanical balancing device aims to maintain to balance the pressure of the active independent fluid-pressure network against the passive one. This would render the active pressure impossible to be used by the actuator coupled to the independent fluid-pressure networks. Consequently, these prior art devices does not meet the pre-requisites for safe operation required by airworthiness regulations.

So presently, the design of fluid-pressure actuators with common outputs has always to consider the worst-case stress and fatigue that could occur in the active-active operation mode, due to force-fight. No fail-safe mechanism for active-passive operation mode seems available.

The following prior art documents are known: EP0112624, EP1504195, U.S. Pat. No. 3,469,501, U.S. Pat. No. 4,549,977, U.S. Pat. No. 8,181,901, US2011/0109671, US2011/0251739, US2011/0108671 and US2012/241563.

The document EP0112624 describes a mechanical balancing valve to balance fluid-pressure values between two fluid networks feeding chambers. The mechanical balancing valve maintains pressures at a pre-determined pressure value in one chamber relative to another chamber. The invention takes advantage of the principles of the valve. The mechanical balancing valve has no "active-passive" operation mode. So, during such operation mode, the valve would maintain to balance the pressure of the active network against the passive one, which would render the active pressure impossible to be used by the actuator.

The document EP1504195 describes an integrated three function valve. In helicopters the three function valve aims to provide a flight critical failure mode, the helicopter having a fly-by-wire rotor control, a triple redundancy hydraulic system and linear variable transducers connected to an actuator.

The document U.S. Pat. No. 3,469,501 describes a by-pass for aircraft control surfaces. The control surfaces are piloted by hydraulic actuators cylinders. A plunger operates a three ways operated valve to close a port or leave it open.

The document U.S. Pat. No. 4,549,977 describes another principle of mechanical balancing valve maintaining pre-determined pressure values, from which invention takes advantage of. The mechanical balancing valve allows a kind of flexible pressure balancing in continuous "active-active" mode of the hydraulic networks, but do not cover the "active-passive" operation mode.

The document U.S. Pat. No. 8,181,901 describes a hybrid helicopter having a rotor and propellers both driven when required by a mechanical interconnection. Second means control e.g. pitch of the rotor or lift-producing/stabilizer surfaces.

The document US2011/0109671 describes electronic force fight compensation that addresses the monitoring of differential chamber pressures. The electronic force fight compensation use pressure sensors and monitoring logics to provide individual actuator control thus balancing out differential chamber pressures.

The document US2011/0251739 describes a distributed flight control fly-by-wire linked to a pair of pilot and co-pilot control sticks. Specific functions like autopilot and programs are taking authority on stability or gust suppression.

The document US2011/0108671 describes another electronic force fight compensation addressing the monitoring of differential chamber pressures.

The document US2012/241563 describes a manual flight control in a rotary wing aircraft. Emergency piloting means have series of actuators.

Despite the valuable enhancements brought to prior art mechanical balancing devices, limits and drawbacks remain for multiple fluid-pressure control actuators system and vehicles operated thanks to such devices and systems.

In fact, there is still a need for further optimizations in order to increase the efficiency and enhance flexibility of mechanical balancing devices, while offering a fail-safe response to mechanical balancing devices controlling fluid-pressure powered actuators systems.

The advantages of the invention depart it from the prior art and provides such optimizations, flexibility and secured response.

The invention is defined by the appended claims, enhancing the prior art corresponding to the document EP0112624 or the document U.S. Pat. No. 4,549,977.

Thus, the invention allows usage of a mechanical balancing device in multiple fluid-pressure actuating systems of vehicle operating controls, flexibly responding to different fluid-pressure levels. The invention allows an automatic balancing of differential fluid-pressures values by the direct application of the fluid-pressure principle of "communicating vessels". Therefore, adverse force fighting between cooperating fluid-pressure actuators will be avoided.

The invention further ensures that the balancing function will not cause loss of cooperating fluid-pressure actuators function in case of occurring of an "active-passive" operating mode.

The invention can be used in many fluid-pressure actuators, e.g. hydraulic, which feature a plurality of common mechanical output members. The invention can be used with such actuators of various types, e.g. provoking linear or rotating displacements of the common mechanical output members.

The invention is not depending of the overall control architecture of the actuating system (e.g. by manual input, by electronic input i.e. fly-by-wire). Though, the invention can be directly incorporated into any existing mechanical design of such actuating systems and does not require any additional external information processing means like complex control electronics architecture.

Therefore, the invention is useful by offering numerous advantages to various types of vehicles, including rotary wing aircraft, drones and/or unmanned aerial vehicles (UAV).

Some examples of objects of the invention are now summarized. These objects are detailed in the appended claims.

BRIEF SUMMARY OF THE INVENTION

An object of the invention is a fluid-pressure balancing device of the mechanical type, for an actuating system.

The actuating system is including first fluid-pressure connecting means to a first fluid-pressure network and second first fluid-pressure connecting means to a second fluid-pressure network, the first fluid-pressure network being independent from the second fluid-pressure network and both networks being connected to the mechanical balancing device; the actuating system having at least a first actuator and a second actuator, the first fluid-pressure connecting means are for linking and feeding the first actuator with fluid-pressure from the first fluid-pressure network, while the second fluid-pressure connecting means are for linking and feeding the second actuator with fluid-pressure from the second fluid-pressure network; the first actuator and the second actuator being mechanically linked to cooperate for displacing at least a first common output member and a second common output member between two extreme control positions; the first and second actuators includes respectively a first and second movable piston each severing an extraction fluid-pressure chamber and a retraction fluid-pressure chamber.

For the fluid-pressure balancing device to provide flexible/continuous force fight compensation for respective first and second actuators, the fluid-pressure balancing device includes, for each of first/second—extension/retraction chambers of the first and second actuators, one dedicated fluid-pressure commanded balance valve; a first balance valve being commanded to balance fluid-pressure from the first fluid-pressure network to a given extension fluid-pressure chamber of the first actuator, is rigidly coupled by a corresponding coupling rod to a cooperating second balancing valve balancing fluid-pressure from the second fluid-pressure network to a given extension fluid-pressure chamber of the second actuator; while a third balancing valve commanded to balance fluid-pressure from the first fluid-pressure network to a given retraction fluid-pressure chamber of the first actuator, is rigidly coupled by another corresponding coupling rod to a cooperating fourth balancing valve balancing fluid-pressure from the first fluid-pressure network to a given retraction fluid-pressure chamber of the second actuator; each fluid-pressure commanded balance valve being arranged to allow relief of differential pressure, directly into a dedicated return pressure relief line of the associated first fluid-pressure network or the associated second fluid-pressure network; a locking assembly cooperating with the mechanical balancing device and includes, for each of a pair of first/second balance valves and third/fourth first balance valves, a fluid-pressure controlled locking device, each locking device having first and second retainer pins adapted to engage with the corresponding coupling rods thus inhibiting the corresponding pair of first/second balance valves and third/fourth first balance valves, in case of loss of fluid-pressure in one of the first fluid-pressure network or the associated second fluid-pressure network.

In an embodiment, each fluid-pressure balancing valve is having a cylinder bore forming a corresponding chamber and therein a slidably movable piston which is displaced under pressure supplied from a corresponding tap line; if displaced, the slidably movable piston is opening a connection port which supplies the corresponding chamber with pressure to a corresponding pressure relief line forming a return circuit of the affected fluid-pressure network, to allow relief of this pressure; the fluid-pressure balancing device includes a flow restrictor in the corresponding tap line, to provide a damping function against instable fluid-pressure feeding of the corresponding slidably movable piston in the balance valve.

In an embodiment, the cylinder bore is sealed with the slidably movable piston of each of the balance valve through high accuracy direct mating, with reduced friction.

In an embodiment, the slidably movable piston of each of the balance valve is equipped with at least one pressure compensating groove; the corresponding cylinder bore being connected to the corresponding pressure relief line so as to return any resulting internal leakage losses inside the cylinder bore, back to a corresponding pressure relief line of the affected fluid-pressure network.

In an embodiment, each of the cylinder bore is physically separated from any other cylinder bore of another chamber in the fluid-pressure balancing device, for avoiding common cause failure and providing independent fluid-pressure networks.

In an embodiment, a pair of the slidably movable pistons of the balancing valves for extension/retraction along the actuating direction of the first and second actuators are mechanically connected by a corresponding coupling rod with a retainer piston; the coupling rod is arranged to displace the slidably movable pistons of the corresponding balancing valves in a cylinder bore of the mechanical balancing device, according to current fluid-pressure values at differential fluid-pressures in related extension/retraction chambers of the first and second actuators; the location inside the corresponding cylinder bore and/or the distance between the pair of mechanically connected slidably movable pistons of the corresponding balancing valves being determined so as to ensure an overlap of the each slidably movable piston with a respective connection port of corresponding of pressure relief lines in the related extension/retraction chamber.

In an embodiment, in at least one of the coupling rods includes adjustment means, the adjustment means being capable of modifying the location along the actuating direction of each slidably movable piston of the corresponding balancing valves inside a corresponding cylinder bore and/or the distance between both pistons of a given pair of mechanically connected slidably movable pistons to ensure a symmetric overlap of the each slidably movable piston with a respective connection port of the pressure relief lines.

In an embodiment, at least one locking device is including adjustment means and the retainer piston is including a retainer pin; the adjustment means ensure simultaneous closure of the corresponding tap lines to return in the connected balancing valves when the retainer pin engages with a hollow housing of complementary shape in a corresponding coupling rod, thus operating a self-centering.

In an embodiment, in an active-active operational mode of the actuator system, at least one of the locking device having at least one engagement spring for a retainer pin, each spring engagement being arranged to oppose to respective fluid-pressure in the corresponding locking device and to lock the corresponding coupling rod thus allowing for commanding the actuator system in a passive-active operational mode.

Another object of the invention is an actuating system for a vehicle, the actuating system having multiple fluid-pressure actuators, the actuating system having at least one mechanical balancing device as exposed above. The fluid-pressure actuators cooperate together so as to produce a power force capable of displacing simultaneously common output members; the simultaneous displacing of the common output members being chosen among: linear motion and rotational motion.

In another embodiment, in the actuating system, displacing of the common output member is a rotational motion and the balancing direction of the mechanical balancing device is parallel to the actuating direction of the actuators in the actuating system.

In another embodiment, in the actuating system, the single output member is dedicated to control systems in the vehicle. The output member is commanding a control system for displacing between two extreme positions one of the group of: surfaces, flaps, brakes, arms, spoilers, flaps, through operation of the fluid-pressure actuators.

A further object of the invention is a vehicle equipped with at least one actuator system including at least one balancing device according to the invention. For instance, the vehicle is an aircraft.

In an embodiment, the vehicle is a rotary with remote piloting functions, e.g. like a remotely pilotable aircraft or a drone or UAV.

In another embodiment, the vehicle is a rotary wing aircraft.

BRIEF DESCRIPTION OF THE SEVERAL VIEWS OF THE DRAWINGS

Now, presently preferred embodiments of the invention are presented with reference to the attached drawings. A short description of the drawings follows.

DETAILED DESCRIPTION OF THE INVENTION

Figure 1:
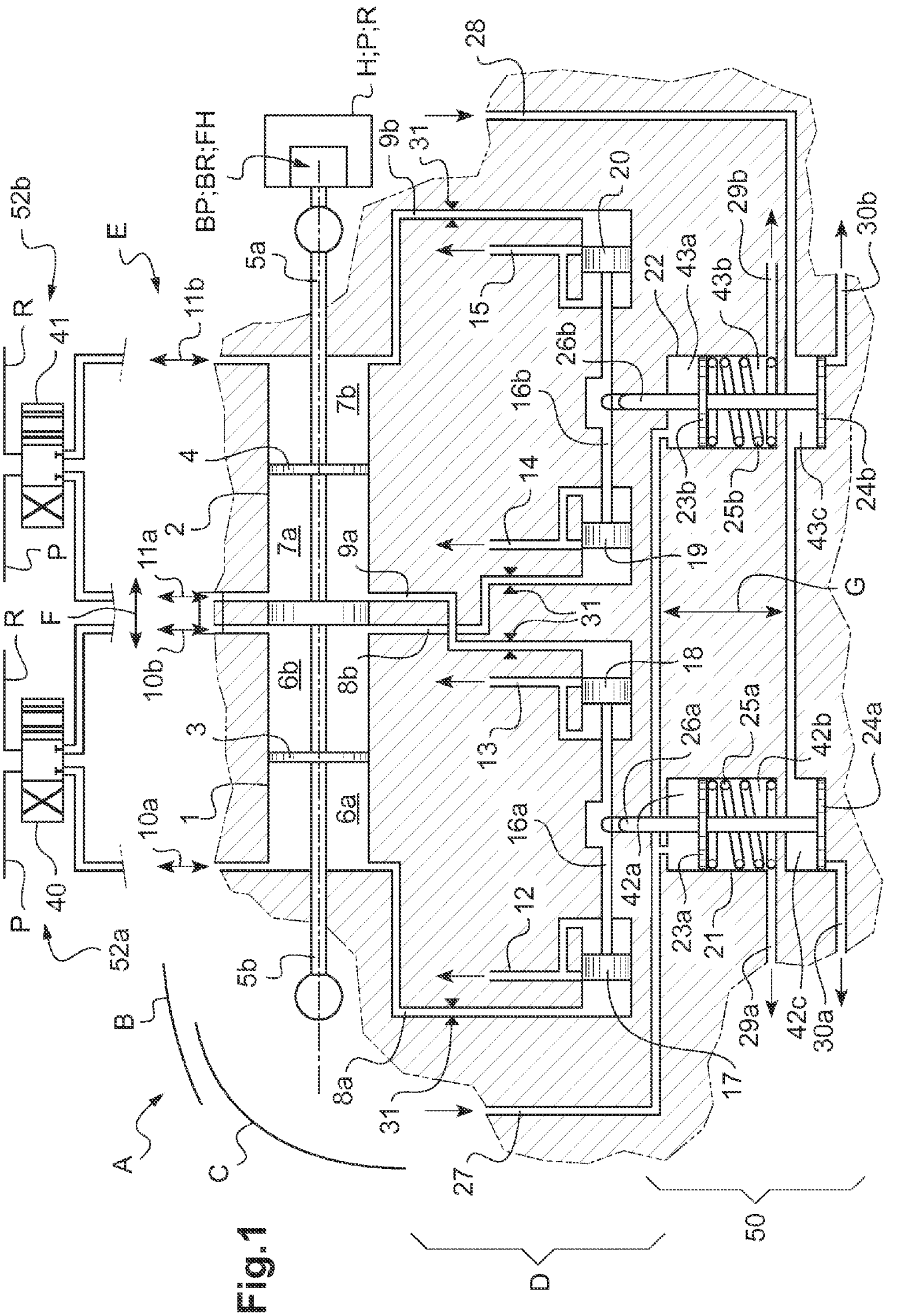
FIG. 1 is a longitudinal cross-section view of an example of linear actuating system including at least one balancing device as per the invention.

A detailed description of illustrated embodiments follows. In Figures drawings, similar elements are given the same reference numerals.

Figure 2:
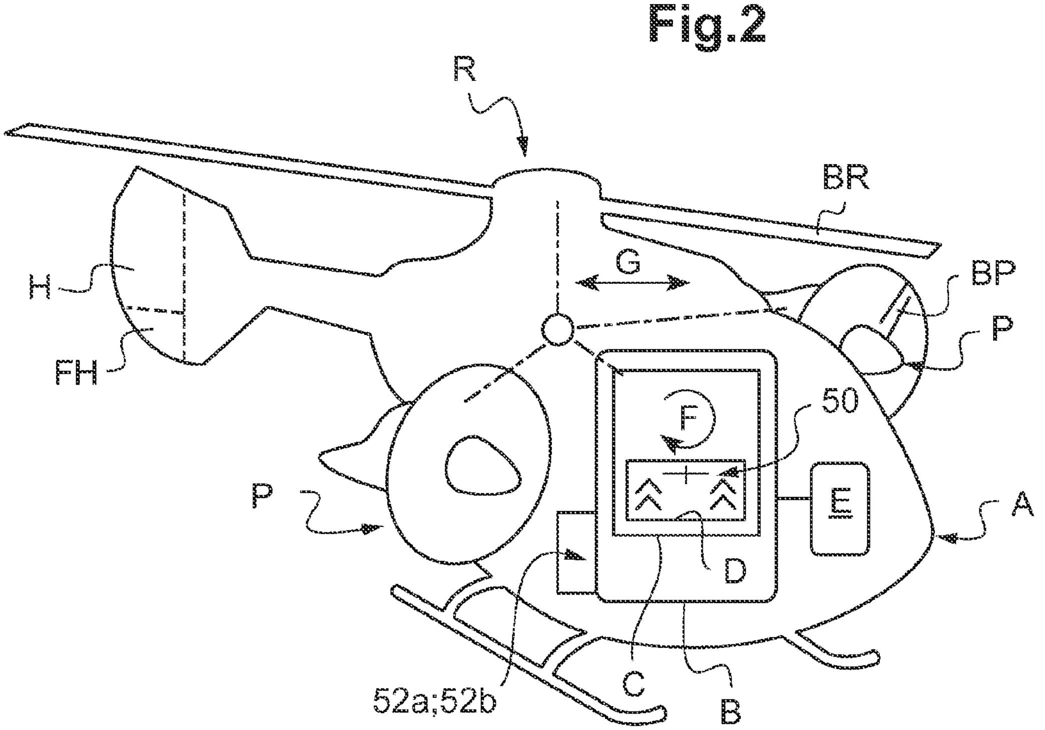
FIG. 2 is a perspective frontward view of an example of vehicle as per the invention, equipped with a rotational actuating system including balancing devices as per the invention.

Generally speaking, on FIGS. 1 and 2, the reference A designates a vehicle.

On examples of FIGS. 1 and 2, such vehicles A are aircrafts. But the invention is obviously useful to many other types of vehicles A, not only aircrafts or vehicles A including hovering/propelling blades. The vehicle A of FIG. 2 is a rotorcraft, thus including a hovering arrangement R with a main rotor having a plurality of hovering surfaces BR, e.g. rotor blades. From FIG. 2, the aircraft vehicle A is also including a pair of propelling arrangements P: the example vehicle A of FIG. 2 is a so-called hybrid helicopter. This example vehicle A is further equipped with a plurality of flight control arrangements H such as flaps, stabilizers or the like, designated as FH.

On FIG. 2, each propelling arrangement P has a plurality of propelling surfaces BP, e.g. propelling blades.

On FIG. 2, the reference B designates a vehicle operating control, exemplified as a flight control installed onboard the vehicle A, but being possibly at least partly remotely connected to an external piloting hub, remote from the vehicle A, e.g. on the ground or in another vehicle.

From FIG. 2, the vehicle A is equipped with one or a plurality of actuating systems C, of the fluid-pressure fed type, e.g. hydraulic. For operating the flight control arrangements, the actuating systems C cooperates with a fluid-pressure assembly E, installed onboard the vehicle A.

The fluid-pressure assembly E typically includes tank(s) or reservoir(s) and fluid-pressure network(s). The invention provides that the fluid-pressure assembly E is having at least a (first) 1st fluid pressure network 52*a* and a (second) $2^{nd}$ fluid pressure network 52*b*, both fluidly connected to the actuating system C.

Besides, each actuating system C is functionally coupled with a mechanical balancing device D. Each actuating system C is also functionally coupled with a mechanical locking assembly 50 e.g. both integrated into the actuating system C and/or into the fluid-pressure assembly E.

On FIG. 2, the actuating system C is rotational i.e. operated around a circular actuating direction F, e.g. a rotational axis. The actuating system C of FIG. 1 is linear i.e. operated along a straight actuating direction F. On FIG. 2, the mechanical locking assembly 50 is linear i.e. operated along a locking/releasing direction G in straight line, e.g. perpendicular to the actuating direction F.

Now referring to FIG. 1 again, an actuating system C is including a mechanical balancing device D and seem likely prone to face a mitigation of force fight between a first actuator 1 and a second actuator 2, both of the fluid-pressure type. The first actuator 1 is of the linear type, as well as the second actuator 2 and both are mechanically coupled one to the other actuator (2-1). The first actuator 1 e.g. for extension motions and first actuator 2 e.g. for retraction motions are both operated along the direction F, one in series with the other from the mechanical output standpoint.

For operation of the actuating system C, the first actuator 1 and the second actuator 2 are respectively fluidly connected to the $1^{st}$ fluid-pressure network 52*a* and to the $2^{nd}$ fluid-pressure network 52*b*, independently one to the other. The $1^{st}$ fluid-pressure network 52*a* dedicated to first actuator 1 and the $2^{nd}$ fluid-pressure network 52*b* dedicated to second actuator 2 are not interconnected one to another, thus being generally distinct and separated from fluid-pressure standpoint.

Despite being fluid-pressure separated, the $1^{st}$ fluid-pressure network 52*a* and the $2^{nd}$ fluid-pressure network 52*b* are balanced via at least one common mechanical balancing device D. Besides, at least one common mechanical locking assembly 50 is also fluidly connected between the $1^{st}$ fluid-pressure network 52*a* and the $2^{nd}$ fluid-pressure network 52*b*, and cooperates with the at least one common mechanical balancing device D.

The actuating system C as well as the balancing device D and the mechanical locking assembly 50 are fluidly connected to the $1^{st}$ fluid-pressure network 52*a* and to the $2^{nd}$ fluid-pressure network 52*b*, respectively by first fluid-pressure connecting means and by second fluid-pressure connecting means (not shown). Thus, the $1^{st}$ fluid-pressure network 52*a* feeds the first actuator 1 via the first fluid-pressure connecting means and the $2^{nd}$ fluid-pressure network 52*b* feeds the second actuator 2 via the second fluid-pressure connecting means.

While being considered as independent from fluid-pressure standpoint, the first actuator 1 and the second actuator 2 are mechanically coupled to common mechanical output members 5*a*, 5*b* and are powered continuously ("active-active"), in normal operation, by the independent first and second fluid-pressure networks 52*a*, 52*b*. In examples, these networks are hydraulic. The first and second fluid-pressure networks 52*a*, 52*b* are powering the actuating system C through feeding/exhaust lines 10*a*, 10*b*, 11*a*, 11*b* connected to related control valves (not shown).

On FIG. 1, the reference P means "pressure", i.e. designates a fluid-pressure feeding line dedicated to the first actuator 1 or to the second actuator 2, respectively. The fluid-pressure feeding line P provides fluid-pressure for moving the corresponding first actuator 1 or second actuator 2 in one given way along the direction F. Oppositely, the reference R means "return" or relief, i.e. designates a fluid-pressure exhaust line dedicated to the first actuator 1 or to the second actuator 2, respectively. The fluid-pressure return line R absorbs exhausting fluid-pressure for moving the corresponding first actuator 1 or second actuator 2 in an opposed way to the one depending from actuation of the fluid-pressure feeding line P, also along the direction F. The fluid-pressure feeding line P and fluid-pressure return line R of each network 52*a*, 52*b* respectively is parts of the actuating system C and/or fluid-pressure assembly E.

On FIG. 1 a first actuator control valve 40 and a second actuator control valve 41 are also shown. The first actuator control valve 40 is dedicated to the first actuator 1 and is connected to the fluid-pressure feeding line P and fluid-pressure return line R of the network 52*a*. The second actuator control valve 41 is dedicated to the second actuator 1 and is connected to the fluid-pressure feeding line P and to the fluid-pressure return line R of the network 52*b*.

On FIG. 1, the first actuator control valve 40 outputs in feeding/exhaust lines 10*a*, 10*b* thus being fluid-pressure linked to the first actuator 1. Similarly, the second actuator control valve 41 outputs in feeding/exhaust lines 11*a*, 11*b* thus being fluid-pressure linked to the second actuator 2.

In this example, the first actuator control valve 40 and the second actuator control valve 41 are multi-stable fluid-pressure valves with at least one "open" stable position allowing fluid-pressure circulating between the fluid-pressure feeding line P and fluid-pressure return line R and the respective first and second actuators 1-2. Another "closed" stable position forbids any fluid-pressure circulation.

On FIG. 1, a first ($1^{st}$) common actuator output member 5*a* is opposed along the direction F to the additional second (2nd) common output member 5*b*, e.g. for a non-plunger linear actuator system C. The actuating system C is then of the multiple fluid-pressure type.

The $1^{st}$ and $2^{nd}$ common output members 5*a*, 5*b* are mechanically linked to at least one arrangement to be controlled. In the case of a vehicle A being a rotorcraft, such arrangement may include at least one of: the propelling arrangements P, the hovering arrangement R, the flight control arrangements H and the corresponding surfaces BP, BR and FH, thus allowing operation of the corresponding arrangement.

On FIG. 1, the first actuator 1 includes a first movable piston 3 of the linear type, and the second actuator 2 includes a second movable piston 4 of the linear type. The fluid-pressure feeding lines P feed fluid-pressure so as to provoke moving along direction F in one way, of the first movable piston 3 and of the second movable piston 4. While exhaust circulation of fluid in the fluid-pressure return lines R allows moving in the opposite way, of the first movable piston 3 and of the second movable piston 4. The actuating system C having common output members, the first movable piston 3 and the second movable piston 4 are mechanically coupled together and are each slidably movable.

Thus, the first and second actuators 1-2 are simultaneously operated relative to the direction F, with the first and second movable pistons 3-4 in series ones with the others, via a longitudinal axis rod (not referenced) linking at a constant distance one from the other, the $1^{st}$ and $2^{nd}$ common mechanical output members 5*a*, 5*b* as well as the appending first movable piston 3 and second movable piston 4. The longitudinal axis rod is one piece in some embodiments, and made of a plurality of assembled elements in other embodiments.

In the example of FIG. 1, the first movable piston 3 and the second movable piston 4 each forms a double sided piston, defining respectively a first extension chamber 6*a* and a first refraction chamber 6*b* for the first actuator 1, and a second extension chamber 7*a* and a second refraction chamber 7*b* for the second actuator 2.

The terms extension/retraction are not binding, but merely define respectively one motion way along/around an actuating direction F of FIGS. 1-2.

The actuating system C includes the first extension chamber 6*a* which is connected to the first fluid-pressure network 52*a*, as well as the first retraction chamber 6*b*. The second extension chamber 7*a* is connected to the second fluid-pressure network 52*b*, as well as a second retraction chamber 7*b*. On FIG. 1, the first and second fluid-pressure networks 52*a*, 52*b* are hydraulic and belong to the fluid-pressure assembly E that comprise e.g. circuitry, reservoir, logic mechanisms and pressure producing gear (not shown).

On FIG. 1, the first movable piston 3 and the second movable piston 4 are slidably mounted inside the corresponding first (extension/retraction) chambers 6*a*, 6*b* and second (extension/retraction) chambers 7*a*, 7*b* respectively.

The first fluid-pressure network 52*a* has a first extension tap line 8*a* for collecting fluid-pressure from the first extension chamber 6*a* during extension movements of the first actuator 1 of the actuating system C. The first fluid-pressure network 52*a* also has a first retraction tap line 8*b* for collecting chamber pressure from the first refraction 6*b* during retraction movements of the first actuator 1.

Similarly, the second fluid-pressure network 52*b* has a second extension tap line 9*a* for collecting chamber pressure from the second extension chamber 7*a* during extension movements of the second actuator 2 of the actuating system C. The second fluid-pressure network 52*b* also has a second retraction tap line 9*b* for collecting chamber pressure from the second extension chamber 7*a* during refraction movements of the second actuator 2 of the actuating system C.

On FIG. 1, the first extension chamber 6*a* is also linked to the first feeding line 10*a*. The first retraction chamber 6*b* is linked to the first exhaust line 10*b*. The second extension chamber 7*a* is linked to the second feeding line 11*a*. The second retraction chamber 7*b* is linked to the second exhaust line 11*b*.

As explained hereinafter, the first/second and extension/retraction tap lines 8*a*, 8*b*, 9*a* and 9*b* do not provoke the control motions (extension/retraction) of the first/second movable pistons 3-4 of the actuation system C, but are fluidly connecting the mechanical balancing device D to the first and second actuators 1-2, only in balancing purpose, i.e. independently from fluid-pressure power furnishing.

Thus, the first/second and extension/retraction tap lines 8*a*, 8*b*, 9*a* and 9*b* are distinct from the $1^{st}$ and $2^{nd}$ fluid-pressure networks 52*a*, 52*b* per se, while being part of the whole fluid-pressure assembly E of the actuating system C. in short, the $1^{st}$ and $2^{nd}$ fluid-pressure networks 52*a*, 52*b* are providing actuation power, while the tap lines 8*a*, 8*b*, 9*a* and 9*b* are merely providing balancing effect to the actuating system C.

On FIG. 1, the first feeding line 10*a* is connected to the actuator control valve 40 among the 1$^{st}$ fluid-pressure network 52*a* and is dedicated to retraction. The first exhaust line 10*b* is connected to the same actuator control valve 40, among the 1st fluid-pressure network 52*a* and is dedicated to extension. The second feeding line 11*a* is connected to the distinct actuator control valve 41 among the 2$^{nd}$ fluid-pressure network 52*b* and is dedicated to retraction. The first exhaust line 11*b* is connected to further the actuator control valve 41 among the 2nd fluid-pressure network 52*b* and is dedicated to extension.

The different pressures supplied from the actuator control valves (40, 41) via these lines (10*a*, 10*b*, 11*a*, 11*b*) generate different pressures in all the extension/retraction chambers (6*a*, 6*b*, 7*a*, 7*b*) of the first actuator 1 and of the second actuator 2. Via the fluid-pressure surfaces of the first and second movable pistons (3, 4), these differential pressures are generating corresponding forces on the common mechanical outputs members 5*a*, 5*b*, so as to either move them/keep them still, relative to the actuating direction F.

In the actuating system C of FIG. 1, at the common mechanical outputs members 5*a*, 5*b*, the sum of the linear forces generated is resulting in a reaction force, causing the common mechanical outputs members 5*a*, 5*b* to move jointly in the desired way (extension/retraction) along the actuating direction F.

The actuating system C of FIG. 2 being rotational, at the mechanical outputs members 5*a*, 5*b*, the sum of the rotational forces generated is resulting in a reaction force, causing the common mechanical outputs 5*a*, 5*b* to rotate jointly in the desired way (clockwise/trigonometric i.e. counterclockwise) around the axis defined by the actuation direction F.

The balancing device D of actuator system C of FIG. 1 has a first extension pressure relief line 12 for the first extension chamber 6*a* which is connected to the fluid-pressure return line R of the first fluid-pressure network 52*a* of the actuator system C/fluid-pressure assembly E.

A second extension pressure relief line 13 is for the second extension chamber 7*a* which is connected to the fluid-pressure return line R of the second fluid-pressure network 52*b* of the actuator system C/fluid-pressure assembly E.

A first retraction pressure relief line 14 is for the first retraction chamber 6*b* which is connected to the fluid pressure return line R of the first fluid-pressure network 52*a* and is connected to the actuator system C/fluid-pressure assembly E.

A second retraction pressure relief line 15 is for the second retraction chamber 7*b* which is connected to the fluid-pressure return line R of the second fluid-pressure network 52*b* and is connected to the actuator system C/fluid-pressure assembly E.

The first/second and extension/retraction pressure relief lines 12-15 are not directly involved in fluid-pressure delivered by the actuator system C but are only parts of the mechanical balancing device D as well as of the fluid-pressure assembly E. Besides, the mechanical balancing device D is having a first balance valve 17 fluid connected to the extension chamber 6*a*, a second balance valve 18 fluid connected to the extension chamber 7*a*, a third balance valve 19 fluid connected to the retraction chamber 6*b* and a fourth balance valve 20 fluid connected to the refraction chamber 7*b*, each arranged so as to be capable to either leave open or close one of the first/second and extension/retraction pressure relief lines 12-15, respectively.

By closing the first/second and extension/retraction pressure relief lines 12-15, the first balance valve 17, second balance valve 18, third balance valve 19 and fourth balance valve 20 avoids respectively for fluid-pressure issued from the first/second and extension/retraction tap lines 8*a*, 8*b*, 9*a* and 9*b*, to reach the corresponding first/second and extension/retraction pressure relief lines 12-15, respectively.

In the mechanical balancing device D of FIG. 1, the first balance valve 17 and the second balance valve 18 are rigidly linked together at a constant distance one from the other, by a first coupling rod 16*a*. Similarly, the third balance valve 19 and the fourth balance valve 20 are rigidly linked together at a constant distance one from the other, by a second coupling rod 16*b*. The term “constant” means here that during operation of the mechanical balancing device D, the distance between the balance valves 17/19 and 19/20 are maintained, so that when one balance valve 17/19 is moved of a given distance, the mechanically coupled balance valve 18/19 is moved by the same distance.

On FIG. 1, the first and second balance valves 17-18 are shaped as sliding pistons each movably mounted inside a respective cylinder bore of the fluid-pressure assembly E. The cylinder bores receiving the first and second balance valves 17-18 are respectively communicating for fluid circulating, to the first extension tap line 8*a* and the first extension pressure relief line 12 and to the second extension tap line 9*a* and the second extension pressure relief line 13. Similarly, the third and fourth balance valves 19-20 are shaped as sliding pistons each movably mounted inside another respective cylinder bore of the fluid-pressure assembly E. The cylinder bores receiving the third and fourth balance valves 19-20 are respectively communicating for fluid circulating, to the first refraction tap line 8*b* and the first retraction pressure relief line 14 and to the second retraction tap line 9*b* and the second retraction pressure relief line 15.

The first coupling rod 16*a* and second coupling rod 16*b* each form a sliding unitary linkage including means for respectively being capable of cooperating with first locking means 21 for extension and second locking means 22 for retraction, both being parts of a mechanical locking assembly 50.

The first balance valve 17 forming a piston extension is connected to the first fluid-pressure network 52*a*. The second balance valve forming a piston extension is connected to the second fluid-pressure network 52*b*. The third balance valve 19 forming a piston retraction is connected to the first fluid-pressure network 52*a*. The fourth balance valve 20 forming a piston refraction is connected to the second fluid-pressure network 52*b*.

The cylinder bores slidably receiving the first, second, third and fourth balancing valves 17-20 respectively, are supplied with chamber pressures from the first/second and extension/refraction tap lines 8*a*, 8*b*, 9*a*, 9*b* that each include a flow restrictor e.g. in the form of a throttle 31.

For each moving direction, respectively two balance valves act as floating pistons are connected via the corresponding coupling rod 16*a*/16*b*: for the extension direction, the first and second balance valves 17, 18 are linked in pair with the first coupling rod 16*a* and for the retraction direction the third and fourth balance valves 19, 20 are linked in pair with the second coupling rod 16*b*.

In the embodiment of FIG. 1, a balancing direction (not referenced) along which the first and second coupling rods 16*a*-*b* are moved, is generally parallel to the actuating direction F. In other embodiments, the balance valves 17-20 are sliding in directions distinct from the direction F, e.g. orthogonal.

In each cylinder bore receiving a piston shaped balancing valve 17-20, along the balancing direction, from an outside end towards an inner end of the mechanical balancing device D, are respectively connected a corresponding:

outer first/second and extension/retraction tap line 8*a*, 8*b*, 9*a* or 9*b*, median first/second and extension/retraction pressure relief line 12, 13, 14 or 15, and inner feed back return loop (not referenced) fluidly connecting a corresponding inner end peripheral portion of the cylinder bore receiving the corresponding piston shaped balancing valve 17-20, to the corresponding median pressure relief line 12, 13, 14 or 15.

Before exposing examples of the operation of the invention, the locking assembly 50 of FIG. 1 is described. The locking assembly 50 is provided with the first locking device 21 for the extension balancing device and with the second locking device 22 for the retraction balancing device. The first locking device 21 and the second locking device 22 are each having a slidably mounted first and second retainer piston 23*a*, 23*b*, 24*a*, 24*b* respectively.

The retainer pistons 23*a* and 24*a* of the first locking device 21 are mounted and rigidly linked to a first retainer pin 26*a*. Similarly, the retainer pistons 23*b* and 24*b* of the second locking device 22 are mounted and rigidly linked to a second retainer pin 26*b*.

In the embodiment of FIG. 1, the locking assembly 50 is provided with two groups of locking/unlocking chambers 42*a*, 42*b* and 42*c*/43*a*, 43*b* and 43*c*. The group of locking/unlocking chambers 42*a*, 42*b* and 42*c* is dedicated to the first locking device 21. The other group of locking/unlocking chambers 43*a*, 43*b* and 43*c* is dedicated to the second locking device 22.

In the embodiment of FIG. 1, the group of locking/unlocking chambers 42*a*, 42*b* and 42*c* is generally at right angle with the actuating direction F. The group of locking/unlocking chambers 43*a*, 43*b* and 43*c* is generally parallel to the group dedicated to the first locking device 21. In other embodiments, groups of chambers have general directions distinct, e.g. parallel to with the actuating direction F.

Each group is composed of three uprightly aligned chambers, i.e. 42*a*/43*a* above, 42*b*/43*b* in the middle of the group and 42*c*/43*c* at the bottom. Each group of chambers 42*a-c* and 43*a-c* have a common operation sliding axis, parallel to a locking/releasing direction G visible on FIG. 1. The retainer pins 26*a-b* are extending along the locking/releasing direction G.

The first retainer pistons 23*a* and 23*b* each define an unlocking chamber 42*a*/43*a* which is connected to the first fluid-pressure network 52*a* via unlocking high pressure line 27, and are shaped as a piston movable along the locking/releasing direction G, inside a corresponding cylinder bore.

The first retainer pistons 23*a* and 23*b* also define respectively a locking chamber 42*b*/43*b*. In each locking chamber 42*b*/43*b* is lodged a first and second engagement springs 25*a*, 25*b*, pressing upwards against the lower side of the corresponding first retainer piston 23*a*/23*b*. On FIG. 1, the first and second engagement springs 25*a*, 25*b* are each coiled and centered with the operation sliding axis, parallel to the locking/releasing direction G.

Furthermore, in the cylinder bore receiving the first retainer pistons 23*a* and 23*b* are respective locking chambers 42*b*/43*b*. The locking chambers 42*b*/43*b* are fluid connected to the fluid-pressure return line R of the first fluid-pressure network 52*a*, respectively via return circuit lines 29*a*, 29*b*.

The second retainer pistons 24*a* and 24*b* have each a disengage or unlocking chamber 42*c*/43*c* respectively. Each unlocking chamber 42*c*/43*c* is connected to the second fluid-pressure network 52*b* via a single unlocking high pressure line 28, the unlocking chambers 42*c* and 43*c* being in fluid communication through a intermediary fluid connection line (not referenced).

The unlocking chambers 42*c*/43*c* are shaped as a piston movable along the locking/releasing direction G, inside a corresponding cylinder bore. Furthermore, in the cylinder bore receiving the second retainer pistons 24*a* and 24*b*, the unlocking chamber 42*c*/43*c* are fluid connected to return pressure circuit of the second fluid-pressure network 52*b* via lines 30*a*, 30*b*.

The FIG. 1 shows that the locking chambers 42*b*/43*b* are in fluid communication via respective first and second return pressure lines 29*a*/29*b*, respectively leading fluid-pressure information to the first fluid-pressure network 52*a* and to the second fluid-pressure network 52*b*. The first retainer pin 26*a* is rigidly assembled with the first and third retainer pistons 23*a* and 24*a*, for locking extension balancing device. The second retainer pin 26*b* is rigidly assembled with the second and fourth retainer pistons 23*b* and 24*b*, for locking retraction of the balancing device D. The first and second retainer pins 26*a*, 26*b* are slidably mounted in respective cylinder bores receiving the first retainer piston 23*a* and second retainer piston 23*b*, respectively. On FIG. 1, the first retainer piston 23*a* and the third retainer piston 24*a* are in distinct cylinder bores. Besides, the second retainer piston 23*b* and the fourth retainer piston 24*b* are in distinct cylinder bores, also separated from the ones of pistons 23*a* and 24*a*.

Besides, in the upper cylinder bore receiving the first retainer piston 23*a* of the first locking device 21 and in the upper cylinder bore receiving the second retainer piston 23*b* of the second locking device 22 is respectively housing the first engagement spring 25*a* for moving the retainer pin 26*a* of the extension balancing device D in the way to engagement along direction G. Similarly, the second engagement spring 25*b* is for moving the retainer pin 26*b* of the retraction balancing device D in the way to engagement along direction G.

From the structure of FIG. 1, the way the mechanical balancing device D is operated is now explained.

In a centered position of the first and second coupling rods 16*a*, 16*b* along a balancing direction (here parallel to direction F), each piston shaped balance valve 17-20 overlaps and closes a median connection port (not referenced). These median connection ports are each connected to the corresponding pressure relief line (12, 13, 14 or 15) leading to the return pressure circuit of the respective first or second fluid-pressure network 52*a*, 52*b*.

When at an outer position of the first and second coupling rods 16*a*, 16*b* along a balancing direction, each piston shaped balance valve 17-20 overlaps and closes a corresponding first/second and extension/retraction tap line 8*a*, 8*b*, 9*a* or 9*b*.

When at an outer position of the first and second coupling rods 16*a*, 16*b* along a balancing direction, each piston shaped balance valve 17-20 overlaps and closes a corresponding inner feed back return loop (not referenced) fluidly connected to the corresponding median pressure relief line 12, 13, 14 or 15.

Each locking device 21-22 is supplied via unlocking pressure from respective lines 27, 28 coming from the corresponding fluid-pressure network 52*a* or 52*b*. This provokes a disengaging motion along the direction G of the corresponding locking, making the tip end of the corresponding pin 26*a*/26*b* remote from the respective first/second coupling rod 16*a*, 16*b*, The centered position do ensure simultaneous closure of the corresponding first/second or extension/retraction tap lines 12-15 to return by overlapping the connection port with the respective balance valve piston 17-20, when the corresponding retainer pin 26*a* or 26*b* engages with the corresponding first or second coupling rod 16*a* or 16*b*. This is referred to as "self-centering".

Based upon example of FIG. 1, the actuating system C functions as follows for the operation mode called "active-active":

Both the first fluid-pressure network 52*a* and second fluid-pressure network 52*b* supply nominal operation pressure. This pressure is respectively supplied via the first disengage locking pressure line 27 and the second disengage locking pressure line 28, to the both first and second locking devices 21-22. Thus, is ensured that the sum of force generated by both first and second fluid-pressure networks 52*a*-*b* on the respective pistons (23*a*, 23*b*, 24*a*, 24*b*) of the mechanical locking assembly 50 is duly resetting both the first and second retainer pins 26*a*, 26*b* against the forces produced by the corresponding first and second engagement springs 25*a*, 25*b*, out of respective receiving housings for these retainer pins in the first and second coupling rods 16*a*, 16*b*. The locking devices 21-22 are disengaged this way.

During operation of the actuating system C, the individual fluid-pressures in the chambers 6*a*-*b*/7*a*-*b* are supplied to the connected balance valves 17-20 so as to provoke sliding of the corresponding movable pistons of the balance valves 17-20, via the corresponding first or second/extension or retraction tap lines 8*a*, 8*b*, 9*a*, 9*b*.

In case of equal pressures in one set of balance valves 17-18 and 19-20, both movable pistons maintain their instant positions.

In case of differential pressures in one set of balance valves 17-18 and 19-20, i.e. when a force fight is occurring inside one of the first or second actuator 1-2, both pistons of the corresponding balance valves 17-18 or 19-20 are displaced by the resulting differential force.

This displacement along the balancing direction (e.g. parallel to direction F as on the embodiment of FIG. 1) cause the opening of the connection port of the respective balance valve 17, 18, 19 or 20 on the side of the mechanical balancing device D where the higher pressure/force level is occurring. This allows to relieve pressure to the return pressure circuit, i.e. the pressure level in the related balance valve 17, 18, 19 or 20 and in the related first or second/extension or refraction chamber 6*a*, 6*b*, 7*a* or 7*b* is decreasing until the resulting differential force causes a reverting displacement of the piston of the related balance valve 17, 18, 19 or 20 to close the corresponding connection port.

As a change of pressure levels occurs when alternative movements relative to the actuating direction F are at high frequencies, the respective flow restrictors 31 (e.g. the throttles arranged in each corresponding first or second/extension or refraction tap lines 8*a*, 8*b*, 9*a* or 9*b*) provide a damping function against unwanted/adverse instable oscillations of the pistons of the first-fourth balance valves 17-20.

This balancing principle applies for both sets of balance valves 17-18 or 19-20.

The actuating system C functions as follows for the operation mode called "active-passive".

In case of switch-off of one the first fluid-pressure network 52*a* or second fluid-pressure network 52*b*, the forces provided by the engagement spring 25*a*, 25*b* overrule the remaining re-setting fluid-pressure forces inside the first and second locking devices 21-22, causing the first and second retainer pins 26*a*, 26*b* of the mechanical locking assembly 50 to be displaced against the retainer piston of the first and second coupling rods 16*a*, 16*b*. When engaged into a hollow housing of the first and second coupling rods 16*a*, 16*b* which is of a complementary shape to the one of the corresponding retainer pin 26*a*, 26*b*, the first and second coupling rods 16*a*, 16*b* are maintained in a static locking (centered) position. The shape of the first and second coupling rods 16*a*, 16*b* and the shape of the retainer pins 26*a*, 26*b* ensure that the displaced retainer pin 26*a*, 26*b* efficiently forces the corresponding first or second coupling rod 16*a*, 16*b* firmly attached with the corresponding first or second coupling rod 16*a*/16*b*, to a position which corresponds to the auto-centering position when engaging.

As soon as both sets of balance valves 17-18/19-20 are in auto-centered position and that any further movement of the corresponding first or second coupling rods 16*a*/16*b* is inhibited by the engaged retainer pins 26*a*/26*b*, the function of the mechanical balance device D is disabled. The invention is useful by proposing at least one mechanical balance device D and one mechanical locking assembly 50 for optimizing the chamber pressures in a multiple actuators actuating system C, comprising e.g.:

- a plurality of fluid-pressure balance valves which allow relief of differential pressure directly into the return line circuit of the associated fluid-pressure networks; and
- for each pair of balance valves, at least one fluid-pressure/spring force controlled locking device, which allows disengaging the function of the balance valves in case of loss of one of the supply fluid-pressures.

The invention is useful when an actuating system C has each balance valves that features a housing with a cylinder bore and an inside floating piston which is operated by pressure supplied by a tap line from one of the actuator chambers.

If displaced, the valve piston opens a connection port which supplies the actuator chamber pressure to a return circuit of the affected fluid-pressure network, thus allowing relief of this pressure.

Having flow restrictor throttles provide a useful damping function against unintentional instable oscillations of the balance valve pistons.

The invention is useful by realizing the sealing of the balance valve piston by high accuracy mating of both piston and valve housing cylinder bore without usage of elastomeric seals. This embodiment enhances reduction of friction losses i.e. efficiency of the balancing function. The piston is also equipped with fluid-pressure compensating grooves. The resulting internal leakage losses will be in the same magnitude as for the control valve and can be rated as tolerable. The internal leakage will be supplied back to the return pressure circuit of the affected fluid-pressure network.

Thus, the balance valve housings are physically separated from each other for common cause failure avoidance and fully separate the independent fluid-pressure networks in a given actuating system C.

The invention is useful in an actuating system C wherein each pair of balance valve pistons for the same operation way (along/around direction F of the actuator are mechanically connected by a coupling rod with retainer piston. Then, the coupling rod displaces both pistons according to the present differential chamber pressures. The adjustment of both pistons to the rod does ensure a symmetric overlap of the each piston with the respective connection port. The overlap size can be defined to the needed level of responsiveness of the actuating system C.

The adjustment of the rod to both balance valve pistons and the shape of the retainer piston with the retainer pin does to ensure simultaneous closure of the tap lines to return in the connected balance valves when the retainer pin engages with the retainer piston (referred as "auto-centering").

The invention is useful in an actuating system C having two fluid-pressure controlled locking devices 21-22. Each locking device features housing where the components are incorporated. It is operated by the first and second fluid-pressure networks 52*a*, 52*b* against a spring load. The sizing of the spring and the piston areas of the retainer pin pistons are defined in a way to ensure that in case of pressure loss either of fluid-pressure networks 52*a*, 52*b*, the retainer pins will perform a sufficient stroke to allow engagement with the retainer piston. This engagement will result in an auto-centering of the coupling rod.

Thus, the locking devices are physically separated from each other for common cause failure avoidance and fully hydraulic system separation.

In embodiments, inside each locking device 21-22, both retainer pin actuating pistons are physically separated from each other for common cause failure avoidance and fully separated fluid-pressure.

The cylindrical bores that form spring chambers of the locking devices 21-22 are connected to the return line circuit of the respectively corresponding fluid-pressure network 52*a*, 52*b*.

The following table T1 is listing the references signs in the drawings.

TABLE T1

| REF. NUM | DESIGNATION | COMMENT |
|---|---|---|
| A | Vehicle | E.g. rotorcraft, UAV . . . |
| B | Vehicle operating control | Onboard vehicle A |
| C | Actuating system | e.g. hydraulic |
| D | Mechanical balancing device | Mechanical |
| E | Fluid-pressure assembly | Includes reservoir(s) and network(s) |
| F | Actuating direction | Linear/Rotational axis |
| G | Locking/Releasing direction | |
| H | Flight control arrangements | |
| P | Propelling arrangement | e.g. turboprop, reactor . . . |
| R | Hovering arrangement | e.g. Main rotor |
| FH | Flight control surface | Stabilizer, flap . . . |
| BP | Propelling surface | Propelling blade . . . |
| BR | Hovering surface | Hovering blade . . . |
| P | Fluid-pressure feeding line | |
| R | Fluid-pressure return line | |
| 1 | First Actuator (e.g. linear) | Connected to 1st Fluid-pressure Network |
| 2 | Second actuator (e.g. linear) | Connected to 2$^{nd}$ Fluid-pressure Network |
| 3 | First movable piston of actuator 1 | Piston 1st Network |
| 4 | Second movable piston of actuator 2 | Piston 2nd Network |
| 5a | First common output member | |
| 5b | Second common output member | e.g. for non-plunger linear actuator |
| 6a | First extension chamber | 1st Network |
| 6b | First retraction chamber | 1st Network |
| 7a | Second extension chamber | 2nd Network |
| 7b | Second retraction chamber | 2nd Network |
| 8a | 1$^{st}$ extension tap line | extension 1st Network |
| 8b | 1$^{st}$ retraction tap line | retraction 1st Network |

TABLE T1-continued

| REF. NUM | DESIGNATION | COMMENT |
|---|---|---|
| 9a | 2nd extension tap line | extension 2nd Network |
| 9b | 2$^{nd}$ retraction tap line | retraction 2nd Network |
| 10a | First feeding line to control valve | 1st Network extension |
| 10b | First exhaust line to control valve | 1st Network retraction |
| 11a | Second feeding line to control valve | 2nd Network extension |
| 11b | Second exhaust line to control valve | 2nd Network retraction |
| 12 | First extension pressure relief line | Extension chamber 1st Network connected to return pressure circuit 1st Network |
| 13 | Second extension pressure relief line | Extension chamber 2nd Network connected to return pressure circuit 2nd Network |
| 14 | First retraction pressure relief line | Retraction chamber 1st Network connected to return pressure circuit 1st Network |
| 15 | Second retraction pressure relief line | Retraction chamber 2nd Network connected to return pressure circuit 2nd Network |
| 16a | First coupling rod | e.g. for extension with retainer piston |
| 16b | Second coupling rod | e.g. for retraction with retainer piston |
| 17 | First balance valve | 1st Network |
| 18 | Second balance valve | 2nd Network |
| 19 | Third balance valve | 1st Network |
| 20 | Fourth balance valve | 2nd Network |
| 21 | First locking device | For extension |
| 22 | Second locking device | For retraction |
| 23a | First retainer piston | 1st Network—Locking extension |
| 23b | Second retainer piston | 2nd Network—Locking extension |
| 24a | Third retainer piston | 1st Network—Locking retraction |
| 24b | Fourth retainer piston | 2nd Network—Locking retraction |
| 25a | First engagement spring for retainer pin | Locking extension |
| 25b | Second engagement spring for retainer pin | Locking Retraction |
| 26a | First retainer pin | Locking extension |
| 26b | Second retainer pin | Locking Retraction |
| 27 | First disengage locking pressure line | Connected to supply pressure circuit 1st Network. |
| 28 | Second disengage locking pressure line | Connected to supply pressure circuit 2nd Network. |
| 29a | First line to return pressure circuit | 1st Network |
| 29b | Second line to return pressure circuit | 1st Network |
| 30a | Third line to return pressure circuit | 2nd Network |
| 30b | Fourth line to return pressure circuit | 2nd Network |
| 31 | Flow restrictor/Throttle | In tap lines 8a-b/9a-b |
| 40 | First actuator control valve | |
| 41 | Second actuator control valve | |
| 42 | | |
| 43 | | |
| 50 | Mechanical locking assembly | e.g. integrated to System C/Assembly E. |
| 52a | First fluid-pressure Network | e.g. Hydraulic |
| 52b | Second first fluid-pressure Network | e.g. Hydraulic |

The invention may be subjected to variations as to its implementation, said variations not being possibly identified exhaustively.

What is claimed is:

1. A mechanical balancing device for a fluid-pressure actuating system; the actuating system including first fluid-pressure connecting means to a first fluid-pressure network and second first fluid-pressure connecting means to a second fluid-pressure network, the first fluid-pressure network being independent from the second fluid-pressure network and both networks being connected to the mechanical balancing device; the actuating system having at least a first actuator and a second actuator, the first fluid-pressure connecting means are for linking and feeding the first actuator with fluid-pressure from the first fluid-pressure network, while the second fluid-pressure connecting means are for linking and feeding the second actuator with fluid-pressure from the second fluid-pressure network; the first actuator and the second actuator being mechanically linked to cooperate for displacing at least a first common output member and a second common output member between two extreme control positions; the first and second actuators includes respectively a first and second movable piston each severing an extraction fluid-pressure chamber and a refraction fluid-pressure chamber, wherein for the fluid-pressure balancing device to provide flexible/continuous force fight compensation for respective first and second actuators, the fluid-pressure balancing device includes, for each of first/second-extension/retraction chambers of the first and second actuators, one dedicated fluid-pressure commanded balance valve; a first balance valve being commanded to balance fluid-pressure from the first fluid-pressure network to a given extension fluid-pressure chamber of the first actuator, is rigidly coupled by a corresponding coupling rod to a cooperating second balancing valve balancing fluid-pressure from the second fluid-pressure network to a given extension fluid-pressure chamber of the second actuator; while a third balancing valve commanded to balance fluid-pressure from the first fluid-pressure network to a given retraction fluid-pressure chamber of the first actuator, is rigidly coupled by another corresponding coupling rod to a cooperating fourth balancing valve balancing fluid-pressure from the first fluid-pressure network to a given retraction fluid-pressure chamber of the second actuator; each fluid-pressure commanded balance valve being arranged to allow relief of differential pressure, directly into a dedicated return pressure relief line of an associated first fluid-pressure network or an associated second fluid-pressure network; a locking assembly cooperating with the mechanical balancing device and includes, for each of a pair of first/second balance valves and third/fourth first balance valves, a fluid-pressure controlled locking device, each locking device having first and second retainer pins adapted to engage with the corresponding coupling rods thus inhibiting the corresponding pair of first/second balance valves and third/fourth first balance valves, in case of loss of fluid-pressure in one of the first fluid-pressure network or the associated second fluid-pressure network.

2. A mechanical balancing device according to claim 1, wherein each fluid-pressure balancing valve is having a cylinder bore forming a corresponding chamber and therein a slidably movable piston which is displaced under pressure supplied from a corresponding tap line; if displaced, the slidably movable piston is opening a connection port which supplies the corresponding chamber with pressure to a corresponding pressure relief line forming a return circuit of the affected fluid-pressure network, to allow relief of this pressure; the fluid-pressure balancing device includes a flow restrictor in the corresponding tap line, to provide a damping function against instable fluid-pressure feeding of the corresponding slidably movable piston in the balance valve.

3. A mechanical balancing device according to claim 2, wherein the cylinder bore is sealed with the slidably movable piston of each of the balance valve through high accuracy direct mating, with reduced friction.

4. A mechanical balancing device according to claim 2, wherein the slidably movable piston of each of the balance valve is equipped with at least one pressure compensating groove; the corresponding cylinder bore being connected to the corresponding pressure relief line so as to return any resulting internal leakage losses inside the cylinder bore, back to a corresponding pressure relief line of the affected fluid-pressure network.

5. A mechanical balancing device according to claim 2, wherein each of the cylinder bore is physically separated from any other cylinder bore of another chamber in the fluid-pressure balancing device, for avoiding common cause failure and providing independent fluid-pressure networks.

6. A mechanical balancing device according to claim 2, wherein a pair of the slidably movable pistons of the balancing valves for extension/retraction along the actuating direction of the first and second actuators are mechanically connected by a corresponding coupling rod with a retainer piston; the coupling rod is arranged to displace the slidably movable pistons of the corresponding balancing valves in a cylinder bore of the mechanical balancing device, according to current fluid-pressure values at differential fluid-pressures in related extension/retraction chambers of the first and second actuators; the location inside the corresponding cylinder bore and/or the distance between the pair of mechanically connected slidably movable pistons of the corresponding balancing valves being determined so as to ensure an overlap of the each slidably movable piston with a respective connection port of corresponding of pressure relief lines in the related extension/refraction chamber.

7. A mechanical balancing device according to claim 6, wherein in at least one of the coupling rod includes adjustment means, the adjustment means being capable of modifying a location along the actuating direction of each slidably movable piston of the corresponding balancing valves inside a corresponding cylinder bore and/or the distance between both pistons of a given pair of mechanically connected slidably movable pistons to ensure a symmetric overlap of the each slidably movable piston with a respective connection port of the pressure relief lines.

8. A mechanical balancing device according to claim 1, wherein at least one locking device is including adjustment means and the retainer piston is including a retainer pin; the adjustment means ensure simultaneous closure of the corresponding tap lines to return in the connected balancing valves when the retainer pin engages with a hollow housing of complementary shape in a corresponding coupling rod, thus operating a self-centering.

9. A mechanical balancing device according to claim 8, wherein in an active-active operational mode of the actuator system, at least one of the locking device having at least one engagement spring for a retainer pin, each spring engagement being arranged to oppose to respective fluid-pressure in the corresponding locking device and to lock the corresponding coupling rod thus allowing for commanding the actuator system in a passive-active operational mode.

10. An actuating system for a vehicle, the actuating system having multiple fluid-pressure actuators; the actuating system having at least one mechanical balancing device according to claim 1, wherein in the actuating system a plurality of fluid-pressure actuators cooperate together so as to produce a power force capable of displacing simultaneously common output members; a simultaneous displacing of the common output members being chosen among: linear motion and rotational motion.

11. An actuating system according to claim 10, wherein the displacing of the common output members is a linear motion and a balancing direction of the mechanical balancing device is parallel to the actuating direction of the actuators in the actuating system.

12. An actuating system according to claim 10, wherein the common output members are dedicated to operation control in a vehicle; the common output members commanding a vehicle operating control for displacing between two extreme positions one of a group of: surfaces, flaps, brakes, arms, spoilers, flaps, through operation of the fluid-pressure actuators.

13. A vehicle equipped with at least one actuator system according to claim 10, wherein the vehicle is an aircraft.

14. A vehicle equipped with at least one actuator system according to claim 10, wherein the vehicle is an aircraft with remote piloting functions, e.g like a remotely pilotable aircraft or a drone or UAV.

15. A vehicle equipped with at least one actuator system according to claim 10, wherein the vehicle is a rotary wing aircraft.

* * * * *